(12) United States Patent
Ueno et al.

(10) Patent No.: US 8,648,574 B2
(45) Date of Patent: Feb. 11, 2014

(54) OUTPUT CONTROL DEVICE FOR HYBRID ENGINE-DRIVEN POWER GENERATOR

(75) Inventors: Masanori Ueno, Saitama (JP); Makoto Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 13/096,538

(22) Filed: Apr. 28, 2011

(65) Prior Publication Data

US 2011/0273148 A1   Nov. 10, 2011

(30) Foreign Application Priority Data

May 6, 2010   (JP) ................... 2010-106350

(51) Int. Cl.
*H02P 11/00* (2006.01)
*H02H 7/06* (2006.01)
*H02P 9/00* (2006.01)
*F02B 63/04* (2006.01)
*H02K 7/18* (2006.01)
*H02P 9/04* (2006.01)

(52) U.S. Cl.
USPC ................... 322/24; 290/1 A; 290/6

(58) Field of Classification Search
USPC ........................ 290/1 A, 6; 322/24
See application file for complete search history.

(56) References Cited

U.S. PATENT DOCUMENTS

| 5,373,195 | A | 12/1994 | De Doncker et al. ............ 307/45 |
| 5,719,486 | A * | 2/1998 | Taniguchi et al. ............... 322/28 |
| 6,879,053 | B1 * | 4/2005 | Welches et al. .................... 290/6 |
| 6,969,922 | B2 * | 11/2005 | Welches et al. ............... 290/1 A |
| 7,176,658 | B2 * | 2/2007 | Quazi et al. ...................... 322/24 |
| 8,497,664 | B2 * | 7/2013 | Hao et al. .......................... 322/24 |
| 8,513,911 | B2 * | 8/2013 | Jones et al. ................... 318/800 |
| 8,525,489 | B2 * | 9/2013 | Ahn et al. ........................ 322/24 |
| 2005/0140142 | A1 * | 6/2005 | Welches et al. ................. 290/41 |
| 2008/0157593 | A1 | 7/2008 | Bax et al. ..................... 307/10.1 |
| 2011/0261597 | A1 * | 10/2011 | Ueno et al. ...................... 363/37 |

FOREIGN PATENT DOCUMENTS

JP           3941927 B2      7/2007

* cited by examiner

*Primary Examiner* — Pedro J Cuevas
(74) *Attorney, Agent, or Firm* — Arent Fox LLP (57) ABSTRACT

A power generator has a battery and an alternator driven by an engine. The battery assists a power energy of the alternator. An inverter circuit is connected to an output of a rectifying circuit. A DC/DC converter boosts a voltage of the battery and inputs the boosted voltage into a constant power regulator. The constant power regulator boosts an input voltage and secures a certain power. An output voltage of the rectifying circuit is monitored by a monitoring means and an output voltage of the battery is monitored by a monitoring means. When the output voltage of the rectifying circuit is equal to or less than a rated voltage, an auxiliary power value corresponding to the remaining amount of the battery is set as a power target value of the constant power regulator.

2 Claims, 7 Drawing Sheets

OUTPUT CONTROL DEVICE FOR HYBRID ENGINE-DRIVEN POWER GENERATOR

TECHNICAL FIELD

The present invention relates to an output control device for a hybrid engine-driven power generator, and particularly to an output control device for a hybrid engine-driven power generator capable of assisting a power energy of an alternator with a battery voltage even when an output voltage of a battery as auxiliary power supply is lower than a generator voltage of the alternator driven by the engine.

BACKGROUND ART

In a conventional engine-driven inverter power generator, a generator output is decided based on an engine output and an efficiency of alternator and inverter. In other words, the generator output supplied to a load is limited by the engine output. There is known a hybrid engine-driven power generator in which a battery as auxiliary power supply is provided and an output voltage of the battery is added to an output voltage of an alternator via a DC/DC converter to supply a generator output having the engine output (power) or more to the load (see Japanese Patent Publication No. 3941927). In the hybrid engine-driven power generator, when the engine frequency reduces due to an overload state so that the generator output of the alternator reduces, the battery voltage is boosted by the DC/DC converter to assist the output of the alternator by the boosted voltage.

CITATION LIST

Patent Literature

Patent Literature 1 "Japanese Patent Publication No. 3941927"

SUMMARY OF INVENTION

Technical Problem

Figure 9:
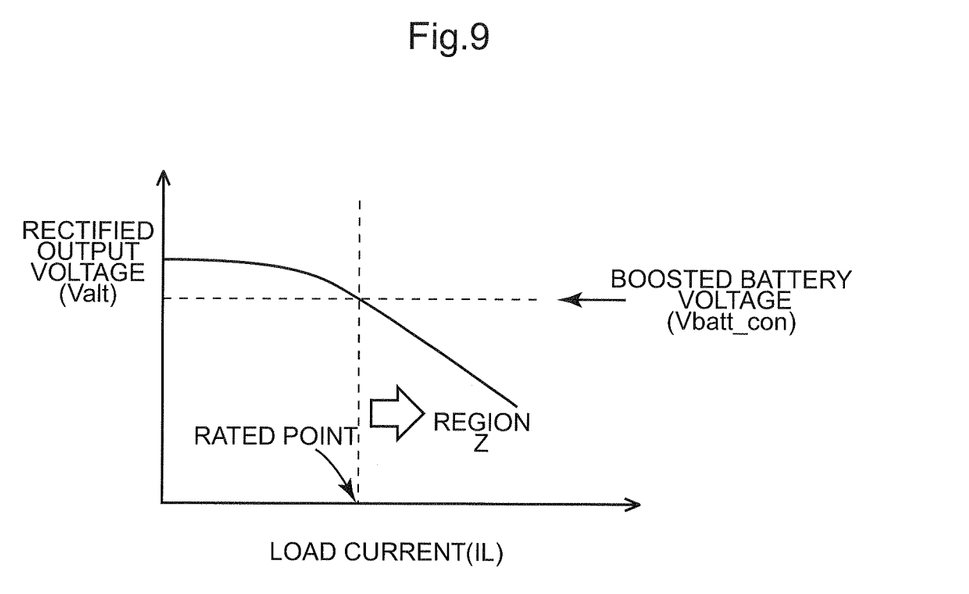
FIG. 9 is a diagram showing an output voltage characteristic of an alternator.

An alternator which is a power generator main body of an engine-driven power generator has a drooping characteristic that an output voltage reduces along with an increase in load current. FIG. 9 is a characteristic diagram showing a relationship between a load current and an output voltage (rectified voltage) of the alternator. As shown in FIG. 9, for the output voltage of the alternator, when a load current IL having a rated point or more flows, a voltage having the rated point or more cannot be outputted. Thus, when the load increases and an output voltage Valt of the alternator is lower than a battery voltage Vbatt (in a region Z having the rated point or more), the output assisting cannot be performed by the battery. Even when the battery voltage Vbatt is boosted by a DC/DC converter to be a high voltage of Vbatt_con, a decrease in the output voltage Valt of the alternator is remarkable at the high load and thus sufficient output assisting by the battery is difficult. Further, even when the output voltage Valt of the alternator does not reduce to a voltage value in which the output assisting is impossible, the amount of output assisting is determined based on a difference between the output voltage Valt of the alternator and the output voltage Vbatt_con of the DC/DC converter and there is a problem that the desired amount of output assisting cannot be obtained.

When the output voltage Vbatt_con of the DC/DC converter is much higher than the output voltage Valt of the alternator, that is, when the alternator does not output a power substantially, the maximum power energy of the power generator has to be managed by the DC/DC converter. In consideration of such a case, for example, when the maximum generator output is 3 kW, the DC/DC converter has to be selected to meet the output of 3 kW.

It is an object of the present invention to provide an output control device for a hybrid engine-driven power generator capable of solving various problems relating to the operations of the above output assisting, and accurately assisting an output of an alternator by a battery voltage irrespective of a relationship between a battery voltage and an output voltage of the alternator.

Solution to Problem

A first feature of the present invention is an output control device for a hybrid engine-driven power generator which has a battery and an alternator driven by an engine, and assists a power energy of the alternator by an output power of the battery, comprising: an inverter circuit connected to an output side of a rectifying circuit for rectifying an output of the alternator; a DC/DC converter connected to the battery; and a constant power regulator provided between the DC/DC converter and an input side of the inverter circuit.

A second feature of the present invention is the output control device for a hybrid engine-driven power generator wherein means for monitoring an output voltage of the rectifying circuit; means for monitoring an output voltage of the battery; and means for, when the output voltage of the rectifying circuit is equal to or less than a rated voltage, driving the DC/DC converter to start outputting an auxiliary power, and determines an auxiliary power value corresponding to the remaining amount of the battery, wherein the determined auxiliary power value is set as a power target value of the constant power regulator.

Advantageous Effects of Invention

According to the present invention having a first feature, a constant power can be inputted into the inverter circuit and a generator output superimposed on an AC output power can be supplied to a load irrespective of whether an output voltage of the DC/DC converter is lower than a rectified output voltage of the alternator. Therefore, a voltage higher than the alternator output, which is outputted from the rectifying circuit, can be formed to always supply an auxiliary power even when the battery voltage varies.

According to the present invention having a second feature, since an auxiliary power value is set as a target power value of the constant power regulator for assisting an output of the alternator, which lowers along with an increase in load current, the power assisting can be effectively performed during overload where the alternator output is lowered.

DESCRIPTION OF EMBODIMENTS

Figure 1:
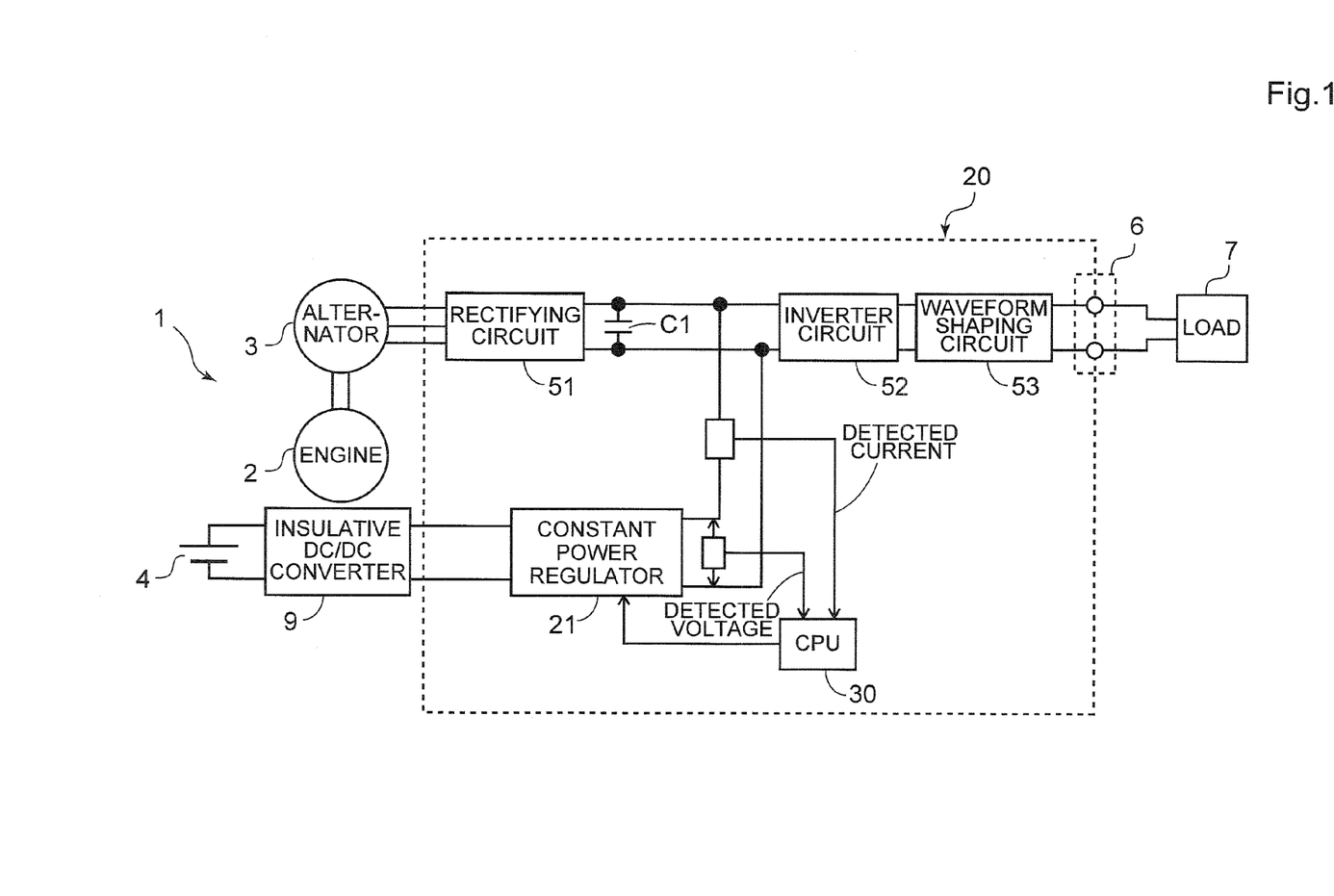
FIG. 1 is a block diagram showing a system structure of a power generator including an output control device according to one embodiment of the present invention.

Embodiments according to the present invention will be described below with reference to the drawings. FIG. 1 is a system structure diagram of a hybrid engine-driven power generator including an output control device according to a first embodiment of the present invention. In FIG. 1, the hybrid engine-driven power generator 1 includes an alternator 3 connected to an engine 2 as first power supply, and a battery 4 as second power supply. An output of the battery 4 is connected to a primary side of an insulative bidirectional DC/DC converter (hereinafter referred to as "insulative DC/DC converter") 9 and the insulative DC/DC converter 9 boosts and outputs an output voltage of the battery 4. The output of the alternator 3 and the output of the boosted battery 4 are summed up in an output control device 20 to be a generator output.

The output control device 20 has a rectifying circuit 51, an inverter circuit 52 and a waveform shaping circuit 53. An output (generator output) of the waveform shaping circuit 53 can be fetched from an output terminal (outlet) 6 to a load 7. A smoothing capacitor C1 is connected to an output of the rectifying circuit 51.

The output control device has a constant power regulator 21. The constant power regulator 21 is connected at its input side to a secondary side of the insulative DC/DC converter 9, controls an input power of the insulative DC/DC converter 9 at a predetermined value (target power value) and inputs the same into the inverter circuit 52. A CPU 30 detects a current and a voltage at an input side of the inverter circuit 52 to calculate a power, and increases or decreases a duty (on-time ratio) of a PWM signal to be inputted into the constant power regulator 21 such that the detected power is converged on the target power value.

Figure 2:
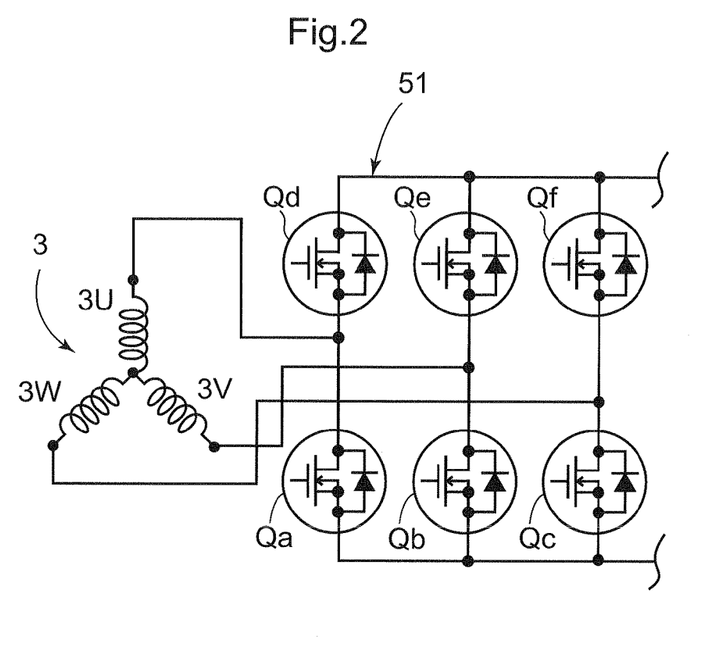
FIG. 2 is a circuit diagram showing a specific example of a rectifying circuit.

FIG. 2 is a circuit diagram showing a specific structure of the rectifying circuit 51. The rectifying circuit 51 is a hybrid bridge rectifying circuit having bridge-connected switching devices (which will be described as "FET" below) Qa, Qb, Qc, Qd, Qe, Qf. A 3-phase winding 3U, a 3-phase winding 3V and a 3-phase winding 3W of the alternator 3 are connected to a coupling point between the FET Qa and the FET Qd, a coupling point between the FET Qb and the FET Qe and a coupling point between the FET Qc and the FET Qf, respectively.

The rectifying circuit 51 rectifies and supplies the output of the alternator 3 to the inverter circuit 52, and functions as a drive inverter for converting a DC output voltage of the battery 4 into a 3-phase AC voltage, and applying the converted voltage to the alternator 3.

Figure 3:
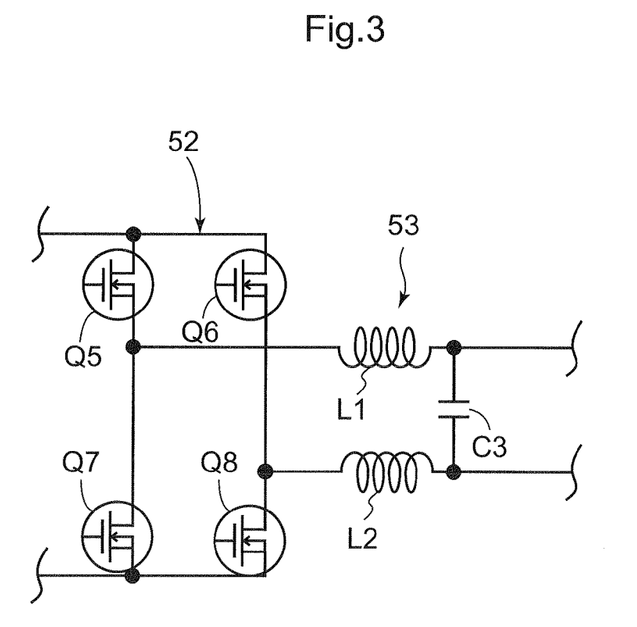
FIG. 3 is a circuit diagram showing a specific example of an inverter circuit.

FIG. 3 is a circuit diagram showing a specific structure of the inverter circuit 52. The inverter circuit 52 is formed by bridge-connecting four FETs Q5, Q6, Q7 and Q8. An output of the inverter circuit 52 is connected to the waveform shaping circuit 53 formed of coils L1, L2 and a capacitor C3.

Figure 4:
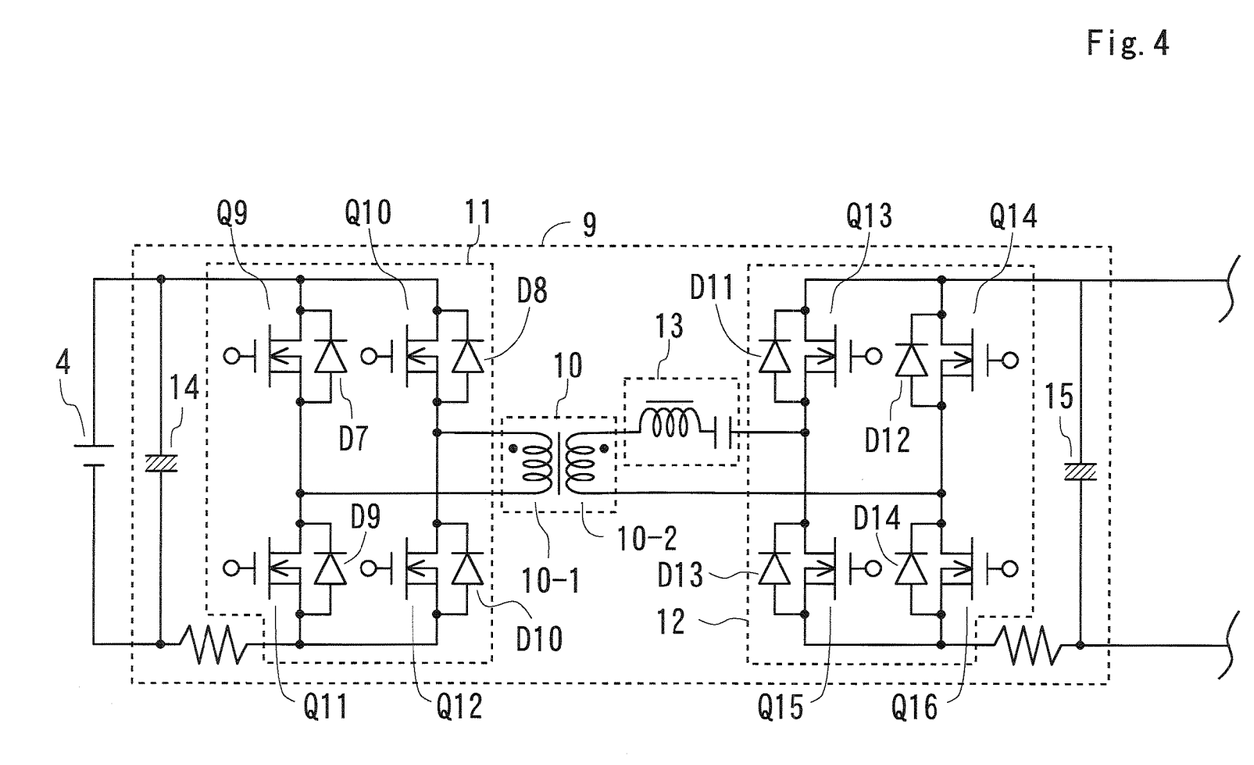
FIG. 4 is a circuit diagram of an insulative DC/DC converter.

FIG. 4 is a circuit diagram showing a structure example of the insulative DC/DC converter 9. The insulative DC/DC converter 9 includes a transformer 10 including a low voltage side winding 10-1 at the primary side and a high voltage side winding 10-2 at the secondary side. A boosted voltage ratio of the insulative DC/DC converter 9 is determined by a winding ratio of the low voltage side winding 10-1 relative to the high voltage side winding 10-2.

A low voltage side switching part 11 is connected to the low voltage side winding 10-1 and a high voltage side switching part 12 is connected to the high voltage side winding 10-2. The low voltage side switching part 11 is configured, for example, by bridge-connecting four FETs Q9, Q10, Q11 and Q12, and the high voltage side switching part 12 is also formed by bridge-connecting four FETs Q13, Q14, Q15 and Q16 similarly.

The FETs Q9 to Q16 of the low voltage side switching part 11 and the high voltage side switching part 12 are connected with diodes D7, D8, D9, D10 and D11, D12, D13, D14 in parallel, respectively. These diodes may be parasitic diodes of the FETs or additionally-connected diodes. The low voltage side switching part 11 and the high voltage side switching part 12 may be assumed as a switching/rectifying part in a combination of the rectifying devices D7 to D14 connected in parallel.

A LC resonance circuit 13 is inserted into the high voltage side winding 10-2 of the transformer 10. The LC resonance circuit 13 functions to make a current flowing when at least one of the low voltage side switching part 11 and the high voltage side switching part 12 is driven into a sinusoidal wave form, to reduce a switching loss, and not to cause FET breakdown due to a large current. This is because the FETs can be powered on or off near the zero cross point of the current in a sinusoidal wave form. The LC resonance circuit 13 may be provided at the primary side not at the secondary side.

The FETs Q9 to Q12 of the low voltage side switching part 11 and the FETs Q13 to Q16 of the high voltage side switching part 12 are controlled for their switching by the CPU 30. Capacitors 14, 15 connected to the primary side and the secondary side are output smoothing capacitors.

The low voltage side switching part 11 and the high voltage side switching part 12 are driven by the same signal to be completely synchronized with each other such that the insulative DC/DC converter 9 automatically performs power conversion bidirectionally. Such driving is performed by alternately powering on and off a pair of FETs Q9 and Q12 and a pair of FETs Q10 and Q11 in the low voltage side switching part 11 and alternately powering on and off a pair of FETs Q13 and Q16 and a pair of FETs Q14 and Q15 in the high voltage side switching part 12, as well known.

Figure 5:
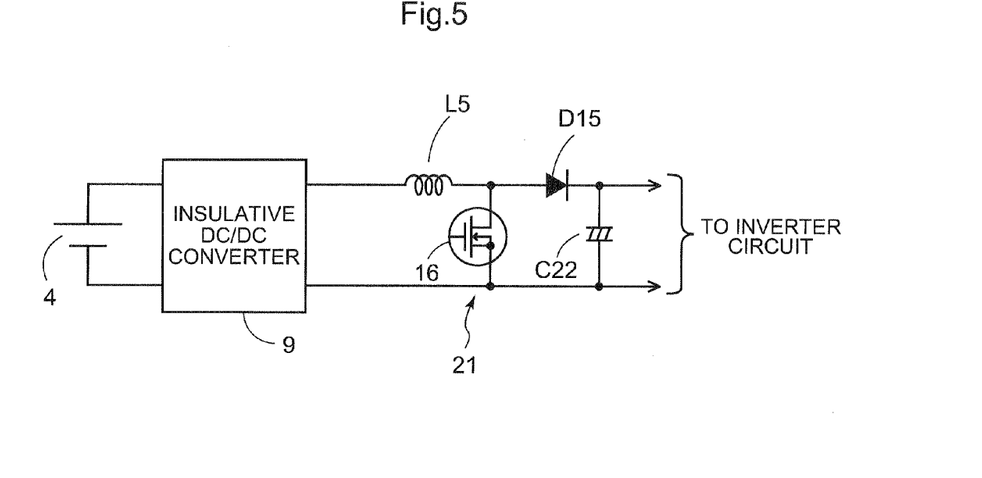
FIG. 5 is a circuit diagram showing a specific example of a constant power regulator.

FIG. 5 is a circuit diagram showing a specific structure of the constant power regulator 21. In FIG. 5, the constant power regulator 21 is configured of a choke coil L5 connected to the secondary side of the insulative DC/DC converter 9, a diode D15, a capacitor C22 and the FET Q16. The choke coil L5 and the diode D15 are connected to a secondary side plus line of the insulative DC/DC converter 9 in serial, and the capacitor C22 and the FET Q16 are connected to the secondary side of the insulative DC/DC converter 9 in parallel. A drain of the FET Q16 is connected to a coupling point between the choke coil L5 and an anode of the diode D15.

The constant power regulator 21 constitutes a voltage boost converter. In other words, charges are accumulated in the choke coil L5 and the capacitor 22 by a voltage inputted from the insulative DC/DC converter 9 while the FET Q16 is being powered on. Then, the accumulated charges are discharged while the FET Q16 is being powered off, and are superimposed on the voltage inputted from the insulative DC/DC converter 9. Consequently, a voltage higher than the voltage inputted from the insulative DC/DC converter 9 is outputted from the constant power regulator 21. The voltage is controlled such that the output of the constant power regulator 21 is converged on a predetermined target power value.

Figure 6:
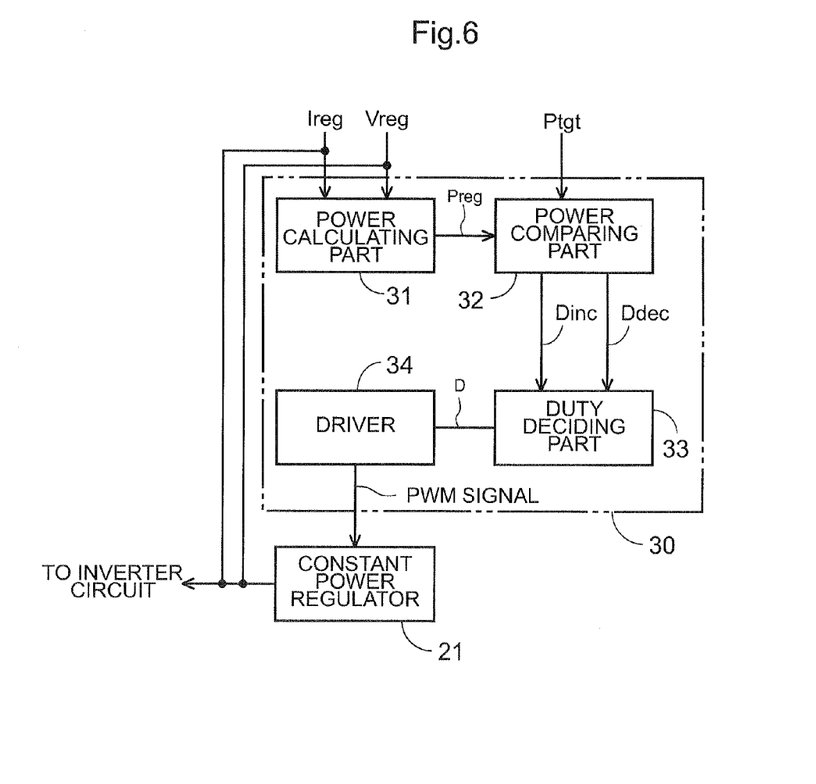
FIG. 6 is a block diagram showing essential functions of the output control device.

FIG. 6 is a block diagram showing essential functions of the CPU 30 provided in the output control device 20 according to the first embodiment. In FIG. 6, an output current value Ireg and an output voltage value Vreg of the constant voltage regulator 21 is inputted to a power calculating part 31 to calculate a power value Preg (Preg=Ireg×Vreg). A power comparing part 32 compares the power value Preg with a target power value Ptgt, then outputs a duty-decreased signal Ddec when the power value Preg is larger than the target power value Ptgt, and outputs a duty-increased signal Dinc when the power value Preg is smaller than the target power value Ptgt. A duty deciding part 33 increases or decreases a duty initial value in response to the duty-increased signal Dinc or the duty-decreased signal Ddec. The duty D decided in the duty deciding part 33 is inputted into a driver 34 and the driver 34 inputs a PWM signal (pulse) having the inputted duty D into the constant power regulator 21. The constant power regulator 21 drives the FET Q16 by the PWM signal and outputs the voltage Vreg decided according to the duty.

In the above embodiment, the constant power regulator 21 is mounted on a substrate common to the respective constituents of the output control device 20. Thus, a control power supply is obtained via the output of the alternator 3 and thus the insulation between the constant power regulator 21 and the output system of the rectifying circuit 51 can be eliminated.

The present invention is not limited to a single control system including the constant power regulator 21, and the constant power regulator 21 may be provided in a independent control system of the output system of the rectifier 51 as described later.

Figure 7:
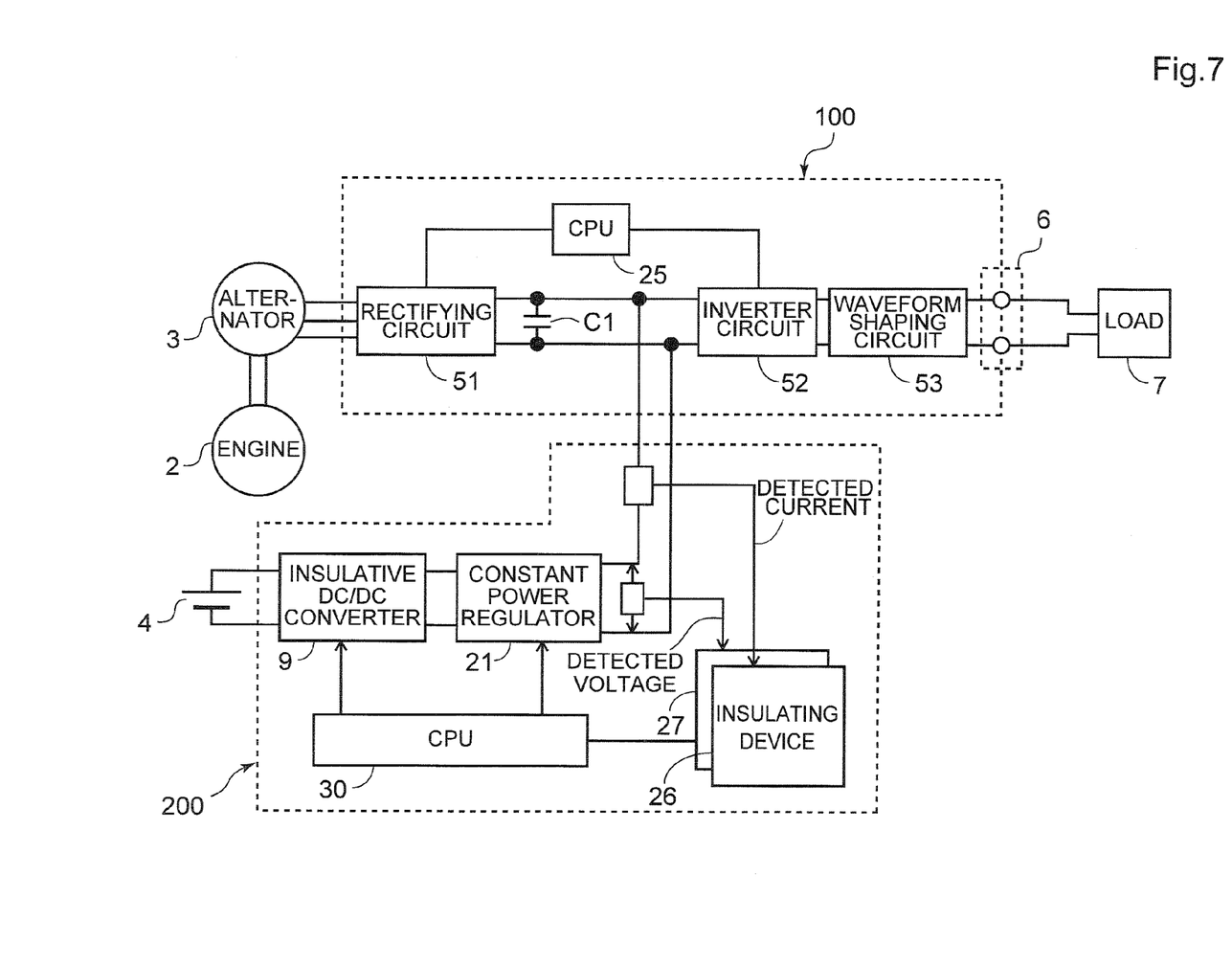
FIG. 7 is a block diagram showing a system structure of a power generator according to a second embodiment.

FIG. 7 is a block diagram showing a system structure of a hybrid engine-driven power generator according to a second embodiment of the present invention, where the same reference numerals as those of FIG. 1 denote the same or similar parts. In the second embodiment, the CPU 30 dedicated to the control of the constant power regulator 21 is provided in the output control device 20 so that the output control device 20 is divided into two control systems. The CPU 30 is provided for controlling the constant power regulator 21 and a CPU 25 is provided for controlling the output system of the rectifying circuit 51. The CPUs 25, 30 are independently supplied with an operational power from the alternator 3 and the battery 4, respectively. In FIG. 7, a first control block 100 is configured of the rectifying circuit 51, the inverter 52 and the waveform shaping circuit 53 as well as the smoothing capacitor C1 and the CPU 25.

The CPU 25 controls the FETs Q1 to Q3 of the rectifying circuit 51 when the rectifying circuit 51 is operated as a drive inverter of the alternator 3. The CPU 25 controls the FETs Q5 to Q8 of the inverter 52 to perform DC/AC conversion. The operation by the CPU 25 is well known.

A second control block 200 is configured of the insulative DC/DC converter 9, the constant power regulator 21, the CPU 30, and insulating devices 26, 27 for inputting a current value and a voltage value, both of which are detected, into the CPU 30, respectively. The CPU 30 controls the constant power regulator 21 as described with reference to FIG. 1, and controls for the voltage boosting operation of the battery output voltage by the insulative DC/DC converter 9.

The insulating devices 26, 27 are a photo coupler made of a light emitting device and a light receiving device. The light emitting device is a light emitting diode, and the light receiving device is a photo transistor for receiving a light from the light emitting diode and generating a current according to the amount of light. The insulating devices 26, 27 input a voltage indicative of a detected current and a detected voltage into the CPU 30.

There is configured such that the CPU 25 is supplied with a power from the rectifying circuit 51 and the CPU 30 is supplied with a power from the battery 4. According to the second embodiment, it is advantageous to take a circuit structure between the two control blocks 100, 200 irrespective of a reference potential, that is, a ground potential.

According to each embodiment described above, a lack of the generator output by the alternator 3 can be compensated for by supplying a constant power from the constant power regulator 21 to the inverter circuit 51 irrespective of the output voltage of the insulative DC/DC converter 9.

The control of the constant power regulator 21 can control the auxiliary amount of the output of the alternator 3 by the output of the battery 4 depending on the state of the battery 4 such as the remaining amount of the battery 4. The auxiliary amount, that is, the auxiliary power is controlled so that the auxiliary power is rapidly output while the battery voltage is shortage, thereby preventing the battery 4 from entering an overdischarge state.

Figure 8:
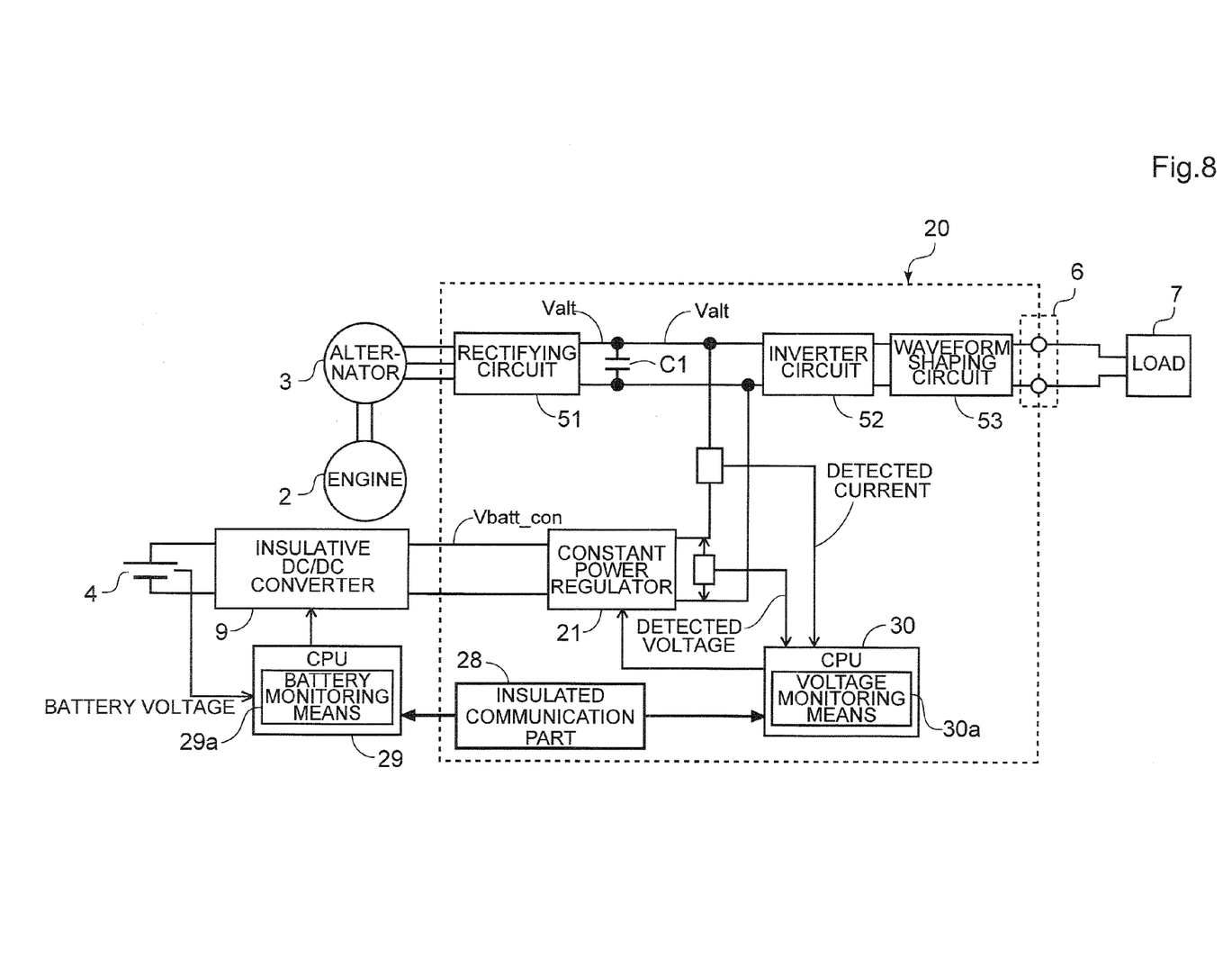
FIG. 8 is a block diagram showing a system structure of a power generator according to a more specific application example of the output control device.

FIG. 8 is a system structure diagram of the output control device 20 for deciding an auxiliary power depending on the state of the battery 4, where the same reference numerals as those of FIG. 1 denote the same or similar parts. The CPU 30 makes communication with a CPU 29 via an insulated communication part 28. The insulated communication part 28 can be formed of a bidirectional photo coupler.

In FIG. 8, since the frequency of the engine 2 decreases in an overload state and thus the power energy of the alternator 3 decreases, the output voltage of the rectifying circuit 51 also reduces. The CPU 30 has a voltage monitoring means 30a for outputting a detection signal when the output voltage of the rectifying circuit 51 is equal to or less than the rated voltage, and transmits digital data (auxiliary power starting instruction) indicative of a decrease in voltage to the CPU 29 via the insulated communication part 28. When the auxiliary power starting instruction is transmitted, the CPU 29 drives the insulative DC/DC converter 9 and starts outputting an auxiliary power.

Further, the CPU 29 always monitors the state of the battery 4. When the auxiliary power starting instruction is transmitted, the CPU 29 reads the voltage of the battery 4 and determines the auxiliary power value according to the remaining amount of the battery. A battery voltage monitoring function (battery monitoring means) 29a is contained in a known battery management system (BMS). The auxiliary power value may be preset as a map, for example, to be larger when the remaining amount of the battery is larger than a predetermined value than when the remaining amount of the battery is smaller than the predetermined value. The determined auxiliary power value is transmitted to the CPU 30 via the insulated communication part 28 and is inputted into the power comparing part 32 shown in FIG. 5 as the target power value Ptgt. In this way, the constant power regulator 21 can input the auxiliary power value according to the state of the battery 4 into the inverter circuit 52.

In the related art, when a battery voltage Vbatt_con boosted by a DC/DC converter is larger than an alternator voltage Valt output from a rectifier, an inrush current flows for compensating for a maximum output of a generator from the battery, the insulative DC/DC converter 9 has to meet the maximum output of the generator for the inrush current. However, according to the present embodiment, the power supplied from the battery 4 converges on the target power value Ptgt and thus the overdischarge of the battery 4 can be prevented, and the insulative DC/DC converter 9 does not need to meet the maximum output of the generator.

In the related art, only when the voltage Vbatt_con boosted by the DC/DC converter was larger than the output voltage Valt of the alternator rectified in the rectifying circuit, the output of the alternator was able to be assisted by the auxiliary power amount primarily decided for a difference between the voltages. On the other hand, according to the present embodiment, the output of the DC/DC converter is further boosted by the constant power regulator thereby to supply a constant power. Therefore, a voltage higher than the alternator output from the rectifier is formed even when the battery voltage fluctuates, thereby always supplying the auxiliary power.

The present invention has been described according to the embodiments, but the present invention is not limited to the embodiments and modifications may be made thereto based on the items described in claims and well-known techniques.

REFERENCE SIGNS LIST

1 . . . hybrid engine-driven power generator
2 . . . engine
3 . . . alternator
4 . . . battery
9 . . . insulative DC/DC converter
21 . . . constant power regulator
26, 27 . . . insulating device
30 . . . CPU
31 . . . power calculating part
32 . . . power comparing part
33 . . . duty deciding part
34 . . . driver
51 . . . rectifying circuit
52 . . . inverter circuit

The invention claimed is:

1. An output control device for a hybrid engine-driven power generator which has a battery and an alternator driven by an engine, and assists a power energy of the alternator by an output power of the battery, comprising:
    an inverter circuit connected to an output side of a rectifying circuit for rectifying an output of the alternator;
    a DC/DC converter connected to the battery; and
    a constant power regulator provided between the DC/DC converter and an input side of the inverter circuit, wherein the constant power regulator is configured to control a voltage input from the DC/DC converter such that the output of the constant power regulator is converged on a predetermined target power value and supplies a constant power to the inverter circuit.

2. The output control device for a hybrid engine-driven power generator according to claim 1, further comprising:
    means for monitoring an output voltage of the rectifying circuit;
    means for monitoring an output voltage of the battery; and
    means for, when the output voltage of the rectifying circuit is equal to or less than a rated voltage, driving the DC/DC converter to start outputting an auxiliary power, and determining an auxiliary power value corresponding to a remaining amount of the battery,
    wherein the determined auxiliary power value is set as a power target value of the constant power regulator.

* * * * *